United States Patent Office 3,473,953
Patented Oct. 21, 1969

3,473,953
PROCESS OF ADHERING A THERMOPLASTIC
RESIN TO A SUBSTRATE AND PRODUCT
PRODUCED THEREBY
Shibley A. Hider, Toledo, Ohio, assignor to Owens-
Illinois, Inc., a corporation of Ohio
No Drawing. Filed June 16, 1966, Ser. No. 557,880
Int. Cl. B44d 1/14; C03c 17/28
U.S. Cl. 117—76                                        8 Claims

ABSTRACT OF THE DISCLOSURE

A method for improving the adhesion of synthetic thermoplastic resins to surfaces such as glass, paper, and the like, wherein the surface is first coated with an inert solution of an orthosilicate ester and the coated surface is heated in the presence of moisture for a period of time sufficient to hydrolyze the ester and deposit silica on the surface. The synthetic thermoplastic resin is then applied to the silica-coated surface and the thermoplastic resin is then allowed to set.

---

This invention relates to an improved method of bonding synthetic thermoplastic resins to various surfaces. More particularly, this invention relates to an improved method of bonding synthetic thermoplastic resins to surfaces such as glass or paper and the like through an intermediate silica layer.

In general, previous attempts at coating bases such as glass and paper with synthetic resins have resulted in a product having poor adhesion between the resin and base with a consequence that the coating eventually "peeled off" leaving the surface of the base unprotected.

In addition to the poor adhesion between coating and base, it was found that the high temperatures required in coating with synthetic resins such as thermoplastic resins limited the surfaces to which the coating could be applied. Associated with the high temperatures was the problem of oxidation which could seriously affect many types of surfaces such as metal surfaces.

To overcome some of the foregoing difficulties, many adhesives have been formulated in an effort to improve the bonding between the base and resinous coating. These adhesives, however, had many disadvantages which limited their commercial value. Adhesives are usually applied in the form of a viscous substance and must be activated prior to the application. Generally, pressure is required to effect a good bond between resin layer and substrate. Such methods are often time consuming and require special apparatus. Moreover, it is difficult to control the thickness of the adhesive layer and as a consequence, a smooth surface was unobtainable.

Accordingly, it is an object of this invention to provide a process for bonding synthetic thermoplastic resins to various surfaces while obviating the disadvantages of prior methods.

It is a further object of this invention to provide a process for bonding synthetic resins to bases by means of an intermediate silica layer.

Still another object of this invention is to provide a method for bonding synthetic resins to surfaces in order to obtain a smooth surface.

Still another object of this invention is to obtain articles having improved properties resulting form the adhesion of the synthetic resins to the base material.

In attaining the objects of this invention, one feature resides in applying an orthosilicate ester to the base, hydrolyzing the ester and coating the resultant silica layer with a synthetic thermoplastic resin.

Other objects, features, and advantages of the invention will be more apparent from the following description thereof.

Generally, the present invention provides a method for treating a surface to greatly increase adhesion to a resin material.

In carrying out the present invention, the substrate is treated with a hydrolyzable orthosilicate having the structural formula:

(RO)4Si in which R is selected from the group consisting of alkyl and aryl groups. Generally, alkyl groups containing 1 to 8 carbon atoms and phenyl are the preferred groups for purposes of this invention. It has been found that the resinous coating which results in more uniform and exhibits greatly increased adhesion between substrate and coating.

As an alternative, the orthosilicate and resinous material may be applied together followed by a second resin coating.

There is virtually no limitation as to the substrate to which this process may be applied, nor is there a limitation as to the synthetic resin coating that may be applied. The resin may be applied in any suitable form, i.e., from solution, melt, extruded film or the like.

Utilizing this technique, such substrates as paper, pulp-glass fiber sheet, glass fiber cloth, glass fiber scrim, or cotton cloth may be successfully coated.

The process of treating the substrate with orthosilicates and resin will depend upon the substrate and although many substrates can be coated by more than one process, there is usually a preferred process. However, any of the conventional coating processes may be used. Thus, orthosilicate may be applied as a spray, in which case the orthosilicate is dissolved in a non-aqueous solvent, or it may be applied by a size press. When paper is the substrate, the orthosilicate may be either a wet web or a dry sheet. For cloth, glass or cotton, the primer and resinous material may be applied by impregnation techniques.

Concentration of orthosilicate in the non-aqueous solvent, such as alcohols and hydrocarbons, varies from about 1–10% but is generally 2–5%. Larger concentrations, up to and including pure orthosilicates, may be used but are not necessary and require greater care so that no more orthosilicate than is necessary is applied.

Orthosilicates which are suitable include, but are not limited to, tetraethylorthosilicate, tetrapropylorthosilicate, tetrabutylorthosilicate and tetraphenylorthosilicate.

Thermoplastic resin materials suitable for purposes of the present invention include polyethylene, polystyrene, polypropylene, polyvinyl chloride and the like. Thickness of the applied resin film may be varied as desired. It is noted that the present invention permits more uniform flow of the thermoplastic film over the treated surface to achieve excellent bonding effects.

The following examples are intended to illustrate how the present invention may be carried out, but are not binding in any way.

EXAMPLE I

Paper sheets are treated with a 3% solution of tetrapropylorthosilicate in propyl alcohol by means of a size press. The sheets are then heated to about 105° C. for a time period sufficient to evaporate the solvent. Following evaporation of solvent, the orthosilicate coated paper while still at 105° C. is subjected to moisture for a sufficient length of time to hydrolyze the orthosilicate and deposit the finely divided silica. The process of evaporating the solvent and hydrolyzing the orthosilicate can be combined into one operation by subjecting the coated sheet to steam for a sufficient length of time to both evaporate the solvent and hydrolyze the orthosilicate.

The concentration of orthosilicate that is deposited on the sheet varies depending upon speed of coating operation and concentration of solution applied. This composition range is between 0.005–0.2% by weight of orthosilicate with a preferred range of 0.01–0.75% by weight. The amount deposited is not critical.

Following coating of the paper with silica, polyethylene is extruded onto the paper sheet at about 200° C. followed by cooling of the resinous coated sheet to room temperature.

In accordance with the present invention, resinous coated paper sheets may be produced which exhibit increased wet tensile strength.

EXAMPLE II

Coating a glass surface with polyvinyl chloride does not normally result in a strong bond between the polymer and glass surface. Adherence of polymer to glass surface is increased by first treating the glass surface with an orthosilicate.

One side of a glass sheet is spray coated with a 5% by weight solution of tetrabutylorthosilicate in toluene. The glass is then heated to 120° C. to evaporate the solvent, followed by hydrolysis with steam. Polyvinyl chloride is then coated onto the glass surface and the composite baked to set the polymer. Resistance to stripping was measurably increased for the orthosilicate primed surface.

EXAMPLE III

Glass fiber cloth is impregnated with a 2% by weight solution of a mixture of polyethylene and tetraethylorthosilicate in cyclohexane, the weight ratio of orthosilicate to polymer is in the range of 1.5–2.5/1. The glass cloth is drained free of excess solution and heated to a temperature of 120–150° C. in a moist air atmosphere to remove the solvent and hydrolyze the orthosilicate. A second polymeric coating is then applied over the combination silica-polymer coating. The outer polymer coating may be a different polymer from that which was added with the orthosilicate.

By following the teachings of the present invention, glass cloth may be treated so as to exhibit improved bonding between glass and polymer, and increased stiffness and improved surface properties.

As will be evident to those skilled in the art, modifications of this invention can be made or followed in the light of the foregoing disclosure without departing from the spirit and scope of the disclosure.

I claim:
1. A process for improving adhesion of synthetic thermoplastic resins to a substrate consisting essentially of coating said substrate with an inert solution of an orthosilicate ester having the following structural formula:

$$(RO)_4Si$$

in which R is selected from the group consisting of alkyl, having 1–8 carbons and phenyl groups, and in which all R groups may be identical; heating the coated article in the presence of moisture for a sufficient period of time to hydrolyze said orthosilicate and deposit silica, applying the synthetic thermoplastic resin to said silica coated substrate, maintaining the substrate at elevated temperature for a sufficient time to permit the thermoplastic resin to form a uniform coating over the substrate and cooling the resultant article to set the resin.

2. A process, as defined in claim 1, in which the substrate to be coated is selected from the group consisting of paper, pulp-glass fiber sheet, glass fiber cloth and cotton cloth.

3. A process, as defined in claim 1, wherein the orthosilicate is applied to a cellulosic paper sheet.

4. A process, as defined in claim 1, in which the R's are alkyl groups having 1–8 carbons.

5. A process, as defined in claim 1, in which the R's are phenyl groups.

6. A process, as defined in claim 1, in which said resin is selected from the group consisting of polyethylene, polystyrene, polypropylene and polyvinyl chloride.

7. A process, as defined in claim 1, wherein said ester is ethylorthosilicate.

8. The product by the process of claim 7 wherein said substrate is paper.

References Cited
UNITED STATES PATENTS

| | | |
|---|---|---|
| 2,380,775 | 7/1945 | Meyer. |
| 2,753,316 | 7/1956 | Campbell. |
| 2,754,224 | 7/1956 | Caroselli. |
| 2,855,329 | 10/1958 | Morton. |

WILLIAM D. MARTIN, Primary Examiner

R. HUSACK, Assistant Examiner

U.S. Cl. X.R.

117—126, 124, 70, 72, 155, 143